United States Patent
Ronay et al.

(10) Patent No.: US 11,619,554 B2
(45) Date of Patent: Apr. 4, 2023

(54) DEFORMABLE SENSORS WITH SELECTIVE RESTRAINT

(71) Applicant: Liquid Wire Inc., Beaverton, OR (US)

(72) Inventors: Mark Ronay, Hillsboro, OR (US); Jorge E. Carbo, Portland, OR (US)

(73) Assignee: Liquid Wire Inc., Portland, OR (US)

( * ) Notice: Subject to any disclaimer, the term of this patent is extended or adjusted under 35 U.S.C. 154(b) by 13 days.

(21) Appl. No.: 16/893,427

(22) Filed: Jun. 4, 2020

(65) Prior Publication Data

US 2020/0386630 A1 Dec. 10, 2020

Related U.S. Application Data

(60) Provisional application No. 62/857,799, filed on Jun. 5, 2019.

(51) Int. Cl.
*G01L 1/04* (2006.01)
*G01L 1/22* (2006.01)
*G01L 1/26* (2006.01)

(52) U.S. Cl.
CPC .............. *G01L 1/04* (2013.01); *G01L 1/2287* (2013.01); *G01L 1/26* (2013.01)

(58) Field of Classification Search
CPC . G01L 1/04; G01L 1/2287; G01L 1/26; G01L 1/18
See application file for complete search history.

(56) References Cited

U.S. PATENT DOCUMENTS

| 3,719,913 A | * | 3/1973 | DuBose | G01L 1/2287 338/2 |
| 4,506,250 A | * | 3/1985 | Kirby | G01L 1/20 29/621.1 |
| 4,708,019 A | * | 11/1987 | Rubner | G01B 7/16 252/500 |

(Continued)

FOREIGN PATENT DOCUMENTS

WO 2020247697 12/2020

OTHER PUBLICATIONS

Ohmite Mfg. Co., FSR Series Force Sensing Resistor, Apr. 2, 2019.
(Continued)

*Primary Examiner* — Tran M. Tran
(74) *Attorney, Agent, or Firm* — Schwegman Lundberg & Woessner, P.A.

(57) ABSTRACT

A sensor may include a deformable sensing element having a deformable conductor arranged to deform in response to deformation of the sensing element, wherein the deformation of the sensing element is selectively controlled. The sensing element may be selectively controlled by a restraining element. The restraining element may control the deformation of the sensing element by distributing forces applied to the sensing element. The sensing element may include a deformable body with the deformable conductor arranged to respond to elongation of the deformable body. The deformable conductor may include a conductive gel. A sensor may include a deformable body, a deformable conductor arranged to deform in response to deformation of the deformable body, and a restraining element arranged to selectively control the deformation of the deformable body.

20 Claims, 4 Drawing Sheets

(56) References Cited

U.S. PATENT DOCUMENTS

| | | | | |
|---|---|---|---|---|
| 4,725,994 | A * | 2/1988 | Kaneko | G01H 11/08 |
| | | | | 310/334 |
| 4,794,365 | A * | 12/1988 | Dunbar | G01G 3/14 |
| | | | | 338/114 |
| 5,056,706 | A * | 10/1991 | Dolbear | H05K 3/3463 |
| | | | | 228/248.1 |
| 5,269,559 | A * | 12/1993 | Filion | B60Q 5/003 |
| | | | | 200/61.54 |
| 5,366,241 | A * | 11/1994 | Kithil | B60R 21/013 |
| | | | | 280/735 |
| 5,391,846 | A | 2/1995 | Taylor et al. | |
| 5,398,962 | A * | 3/1995 | Kropp | H01H 13/785 |
| | | | | 200/61.54 |
| 5,539,259 | A * | 7/1996 | Filion | B60R 21/21658 |
| | | | | 200/61.54 |
| 5,576,684 | A * | 11/1996 | Langford | B60Q 5/00 |
| | | | | 338/50 |
| 5,961,144 | A | 10/1999 | Desmarais | |
| 6,781,284 | B1 | 8/2004 | Pelrine et al. | |
| 6,812,624 | B1 | 11/2004 | Pei et al. | |
| 7,500,399 | B2 * | 3/2009 | Cheng | G01B 7/18 |
| | | | | 73/777 |
| 7,509,835 | B2 | 3/2009 | Beck | |
| 7,703,333 | B2 | 4/2010 | Hayakawa et al. | |
| 7,854,173 | B2 | 12/2010 | Cheng et al. | |
| 8,069,735 | B1 | 12/2011 | Egorov et al. | |
| 8,250,927 | B2 * | 8/2012 | Anand | G01B 7/18 |
| | | | | 73/777 |
| 8,298,648 | B2 * | 10/2012 | Turner | A41D 13/05 |
| | | | | 428/138 |
| 8,451,011 | B2 * | 5/2013 | Hayakawa | G01L 1/142 |
| | | | | 324/658 |
| 8,587,493 | B2 * | 11/2013 | Dickey | G01L 1/205 |
| | | | | 343/789 |
| 8,800,386 | B2 * | 8/2014 | Taylor | G01L 1/18 |
| | | | | 73/862.044 |
| 8,931,351 | B2 | 1/2015 | Muramatsu et al. | |
| 8,997,579 | B2 * | 4/2015 | Carbo | G01M 7/08 |
| | | | | 73/855 |
| 9,080,931 | B2 * | 7/2015 | Carbo, Jr. | G01M 7/08 |
| 9,228,822 | B2 * | 1/2016 | Majidi | G01B 7/18 |
| 9,371,823 | B2 * | 6/2016 | Hongo | F03G 7/065 |
| 9,625,362 | B2 * | 4/2017 | Carbo | G01M 7/08 |
| 9,671,297 | B2 | 6/2017 | Sibbett et al. | |
| 9,753,568 | B2 | 9/2017 | McMillen | |
| 9,797,791 | B2 * | 10/2017 | Vogt | G01L 5/1627 |
| 9,820,055 | B2 | 11/2017 | Babayoff et al. | |
| 10,146,257 | B2 * | 12/2018 | Alonso | G06F 3/0412 |
| 10,293,490 | B2 * | 5/2019 | Charalambides | G01L 1/205 |
| 10,352,788 | B2 * | 7/2019 | Eventoff | G01L 1/205 |
| 10,375,765 | B2 * | 8/2019 | Chaffins | H05K 3/12 |
| 10,378,975 | B1 * | 8/2019 | Sun | G06F 3/045 |
| 10,401,240 | B2 * | 9/2019 | Lee | G01L 1/2287 |
| 10,481,021 | B2 * | 11/2019 | Pan | A61B 5/6803 |
| 10,488,276 | B2 * | 11/2019 | Kenry | G01L 5/226 |
| 10,527,507 | B2 * | 1/2020 | Wood | A43B 23/029 |
| 10,555,609 | B2 | 2/2020 | Park et al. | |
| 10,612,986 | B2 * | 4/2020 | Lewis | G01L 1/2287 |
| 10,617,809 | B2 | 4/2020 | Weaver et al. | |
| 10,641,666 | B2 | 5/2020 | Kim et al. | |
| 10,672,530 | B2 | 6/2020 | Ronay | |
| 10,716,884 | B2 | 7/2020 | Weaver et al. | |
| 10,903,762 | B2 * | 1/2021 | Hendriks | H01L 41/083 |
| 10,928,283 | B2 * | 2/2021 | Pelssers | A61B 5/0053 |
| 11,090,862 | B2 * | 8/2021 | Chaffins | H05K 1/167 |
| 11,131,589 | B2 * | 9/2021 | Shih | G01P 15/09 |
| 2008/0066564 | A1 | 3/2008 | Hayakawa et al. | |
| 2009/0120696 | A1 | 5/2009 | Hayakawa et al. | |
| 2010/0132476 | A1 | 6/2010 | Cheng et al. | |
| 2015/0000418 | A1 | 1/2015 | Bach | |
| 2015/0270089 | A1 | 9/2015 | Ghanea-Hercock | |
| 2016/0037625 | A1 | 2/2016 | Huitema et al. | |
| 2016/0049227 | A1 | 2/2016 | Bottiglio et al. | |
| 2018/0243924 | A1 * | 8/2018 | Visell | G01L 5/228 |
| 2019/0056277 | A1 | 2/2019 | Ronay | |
| 2019/0310144 | A1 * | 10/2019 | Sun | G06F 3/045 |
| 2019/0368952 | A1 | 12/2019 | Li | |

OTHER PUBLICATIONS

Tekscan, Tekscan Force Sensors for Design, Feb. 3, 2017.
PCTUS2020036215 International Search Report and Written Opinion, dated Sep. 8, 2020.
"International Application Serial No. PCT US2020 036215, International Preliminary Report on Patentability dated Dec. 16, 2021", 7 pgs.
"Chinese Application Serial No. 202090000638.4, Office Action dated Apr. 11, 2022", with machine translation, 10 pgs.
"Chinese Application Serial No. 202090000638.4, Response filed Aug. 26, 2022 to Office Action dated Apr. 11, 2022", with English translation of claims, 21 pgs.
"Chinese Application Serial No. 202090000638.4, Voluntary Amendment filed Feb. 7, 2022", w/English Claims, 19 pgs.

* cited by examiner

DEFORMABLE SENSORS WITH SELECTIVE RESTRAINT

CROSS-REFERENCE TO RELATED APPLICATION

This application claims priority from U.S. Provisional Patent Application Ser. No. 62/857,799 filed Jun. 5, 2019 which is incorporated by reference.

BACKGROUND

The inventive principles of this patent disclosure relate generally to sensors, and more specifically to deformable sensors that may selectively respond to one or more stimuli.

SUMMARY

A sensor may include a deformable sensing element having a deformable conductor arranged to deform in response to deformation of the sensing element, wherein the deformation of the sensing element is selectively controlled. The sensing element may be selectively controlled by a restraining element. The restraining element may control the deformation of the sensing element by distributing forces applied to the sensing element. The sensing element may include a deformable body with the deformable conductor arranged to respond to elongation of the deformable body. The sensing element may be folded into a stacked configuration. The restraining element may include a piece of material having a greater modulus of elasticity than the deformable body. The restraining element may include a flat sheet disposed on top of the folded sensing element. The sensing element may be disposed on a reactional ground plane. The sensor may further include a second restraining element arranged to selectively control the sensing element. The second restraining element may include a sheet of material disposed between layers of the folded sensing element. The restraining element may surround the deformable body in at least one dimension. The restraining element may surround the deformable body in a plane. The sensing element may be elongate in a first direction. The restraining element may restrain the sensing element in the first direction. The restraining element may include a two-way stretch fabric. The deformable body may include a core having a generally semi-circular cross-section. The deformable conductor may include a conductive gel. The conductive gel may include a gallium alloy.

A method of sensing a stimulus may include deforming a sensing element having a deformable conductor arranged to deform in response to deformation of the sensing element and selectively controlling the deformation of the sensing element.

A sensor may include a deformable body, a deformable conductor arranged to deform in response to deformation of the deformable body, and a restraining element arranged to selectively control the deformation of the deformable body.

BRIEF DESCRIPTION OF THE DRAWINGS

The figures are not necessarily drawn to scale and elements of similar structures or functions may generally be represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings.

DETAILED DESCRIPTION

Figure 1:
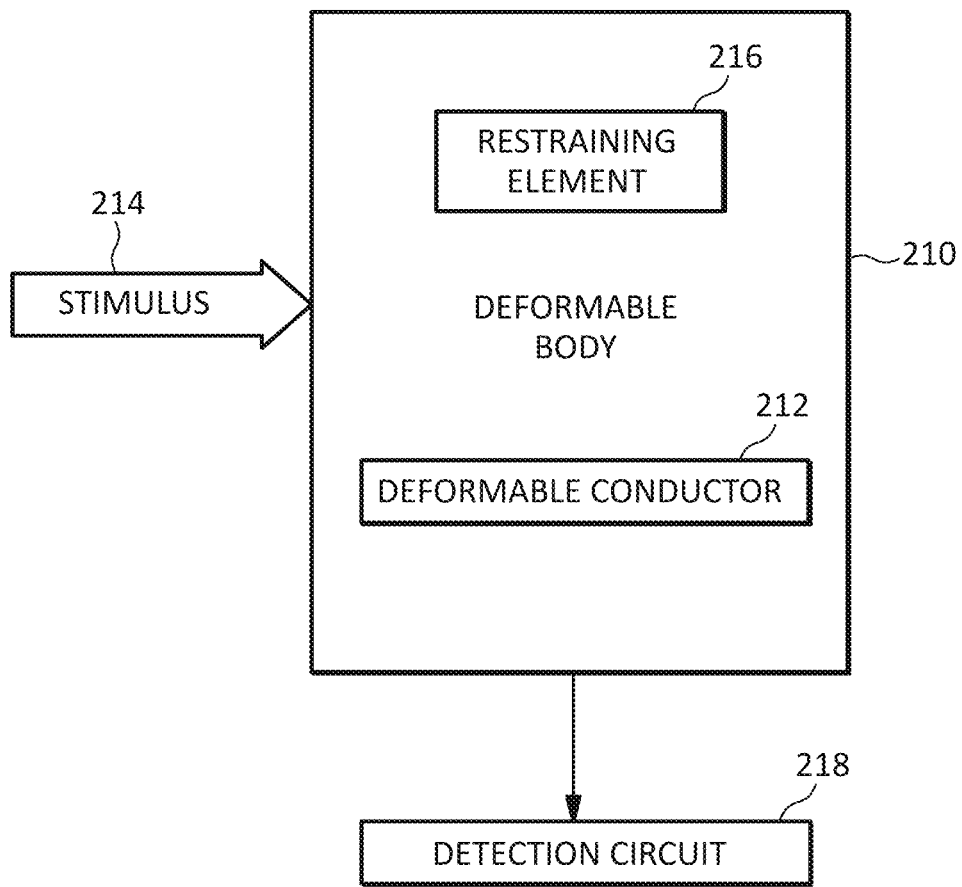
FIG. 1 is a schematic diagram of an embodiment of a deformable sensor according to some of the inventive principles of this patent disclosure.

FIG. 1 illustrates an embodiment of a deformable sensor according to some of the inventive principles of this patent disclosure. In the embodiment of FIG. 1, a deformable body 210 has a deformable conductor 212 arranged such that application of one or more stimuli 214 to the body 210 causes deformation of the body and a resulting deformation of the conductor 212. The deformation of the body 210, and thus the conductor 212, is selectively controlled by one or more restraining elements 216. The one or more restraining elements 216 may be arranged to restrain, enhance, redirect, redistribute, or otherwise alter, control or manipulate the deformation of the body 210 and conductor 212 in response to the one or more stimuli 214 such as pressure, force, vibration, etc. A restraining element may be integral with or separate from the deformable body 210, or it may be arranged in a hybrid configuration. In embodiments having multiple restraining elements, the restraining elements may be arranged in any combination of integral, separate or hybrid configurations. In some embodiments, the deformable body 210 may be implemented with multiple deformable bodies.

A detection circuit 218 is arranged to detect a change in an electrical characteristic such as resistance, reactance (e.g., inductance or capacitance), etc., of the deformable conductor 212 in response to the one or more stimuli 214.

By way of example, and without limitation, one or more restraining elements may be arranged to constrain a first portion of a deformable body so that the first portion deforms less or not at all in response to a stimulus while allowing a second portion to deform more than the first portion in response to the stimulus. As another example, one or more restraining elements may be arranged to prevent or limit the deformation of a body along a first axis while allowing some or more deformation along a second axis. As yet another example, one or more restraining elements may be arranged to cause a sensor to be immune or relatively insensitive to certain types of stimuli such as twisting or stretching forces that distort the sensor, while being more sensitive to another type of stimulus such as a pressure applied to the sensor.

Figure 2:
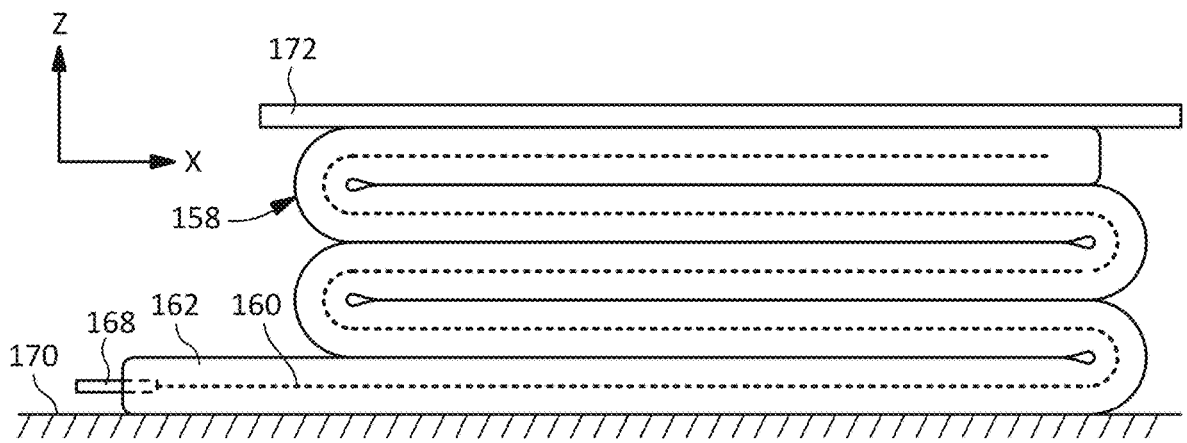
FIG. 2 is a side view of another embodiment of a deformable sensor in a relaxed or neutral state according to some of the inventive principles of this patent disclosure.
Figure 5:
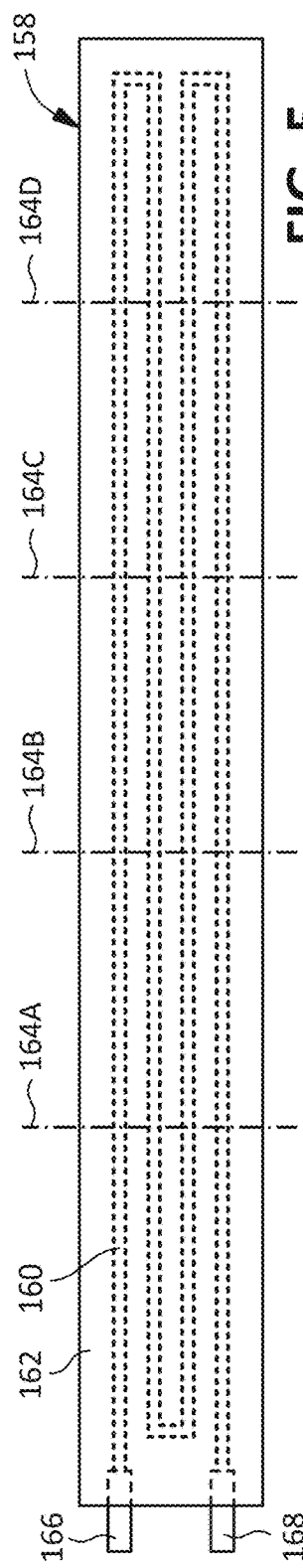
FIGS. 5 and 6 are top and side views of an embodiment of a deformable sensing element suitable for use in the sensor of FIG. 2 according to some of the inventive principles of this patent disclosure.
Figure 6:
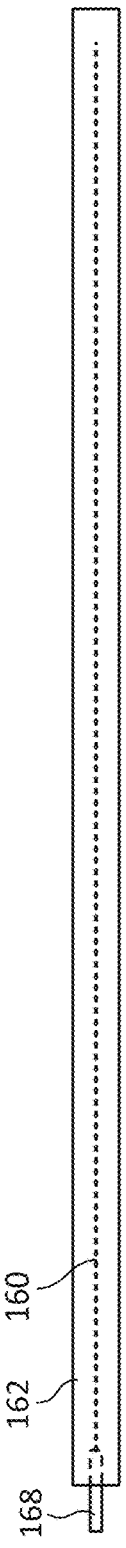

FIG. 2 illustrates another embodiment of a sensor utilizing selective restraint according to some inventive principles of this patent disclosure. The embodiment of FIG. 2 includes a deformable sensing element 158 which begins as a flat strip as shown in FIGS. 5 and 6 and is then folded along the dot-dash lines 164 to form the stacked structure shown in FIG. 2. The sensing element 158 includes a deformable body 162 having a pattern 160 made from a deformable conductor arranged to deform in response to deformation of the sensing element. Terminals 166 and 168 provide electrical connections to the deformable conductor 160. The folded sensing element 158 is shown on a reactional ground plane 170. A restraining element 172 is arranged to selectively control the deformation of the sensing element.

The embodiment of FIG. 2 may be implemented with a wide variety of materials and used in countless applications. Some of the inventive principles will be described in the context of an example embodiment in which the sensor is used as a force (and/or pressure) sensor, but the inventive principles are not limited to these details.

In the example force sensor embodiment, the deformable conductor 160 may be a conductive gel such as any of the eutectic gallium alloys describe below. The conductive gel may be patterned on a substrate of relatively soft elastomeric material such as a soft thermoplastic polyurethane (TPU) and encapsulated with another layer of TPU to form the deformable body 162. In some implementations, the folded layers of the body may be secured to each other with adhesives, or through some form of induced bonding, e.g., ultrasonic or RF welding, etc. In other implementations, the layers may stick together through friction, natural surface adhesion, or any other suitable technique.

In the example force sensor embodiment, the restraining element 172 may be implemented with a layer of material that is more rigid than the deformable body 162, for example a sheet of polycarbonate.

Figure 3:
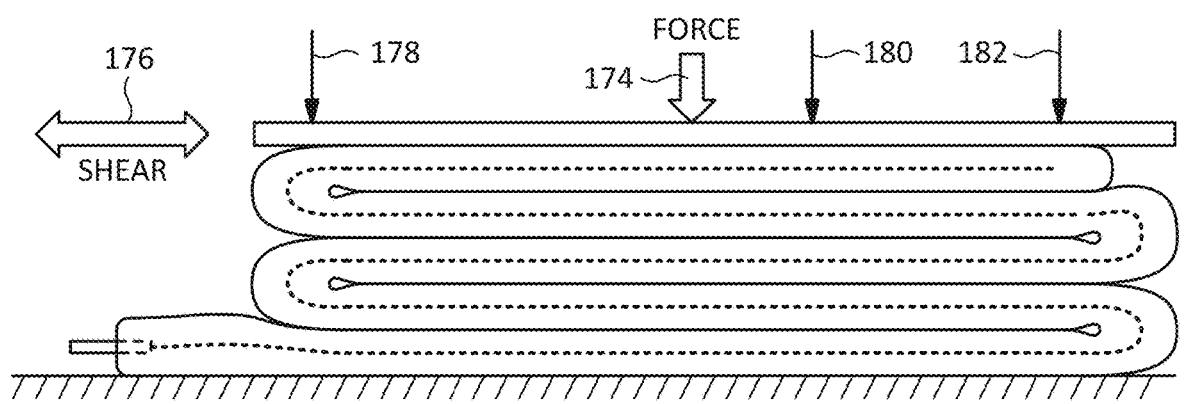
FIG. 3 is a side view of the embodiment of FIG. 2 with a stimulus is applied.

In FIG. 2, the sensor is shown in a neutral or relaxed state with no forces applied. FIG. 3 shows the sensor in a deformed state due to the application of a force (pressure) 174 to the restraining element 172 generally in the vertical direction along the z-axis. This force results in a compression of the folded layers of the deformable body 162 which may cause a stretching action as the U-shaped portions bulge outward (generally in the horizontal direction along the x-axis), thereby lengthening the path of the deformable conductors and/or causing any other deformation that results in a measurable change in the resistance of the pattern of conductive gel.

The embodiment of FIGS. 2, 3, 5 and 6 may be used in many different applications. In one example application, the example force sensor embodiment may be used to measure impact or other forces in an athletic shoe. For example, the sensor element 158 may be adhered or otherwise placed on a strobel or sole of an athletic shoe, with or without an additional intervening layer of relatively stiff material such as polycarbonate. An insole may then be placed over the sensor such that the downward force of a wearer's foot on the strobel or sole is transmitted to the restraining element 172, and thus the sensing element 158, each time the shoe lands on a rigid surface. A potential advantage of the embodiment of FIGS. 2 and 3 is that, depending on the implementation details, it may be highly resistant to horizontal shear forces show by arrow 176 in the direction of the x-axis, and the y-axis (into or out of the plane of drawing). This may be important in athletic shoe applications and other applications where forces sought to be measured in one direction are often accompanied by very high shear forces in another direction that often causes other types of forces sensors such as thin film sensors to fail or lose effectiveness.

In the absence of the restraining element 172, various forces applied to the sensor may cause a change in resistance, but with uncertainty as to the nature of the force. For example, it may be caused by a localized force (e.g., from a protruding foot bone or particle of turf infill) applied in the vicinity of any of arrows 178, 180 or 182 which may distort the sensing body 162 in a way that does not represent the overall force or pressure sought to be measured. The restraining element 172 may distribute forces over the top surface of the sensing element 158, thereby preventing unwanted distortion. The restraining element 172 may also cause the sensing element 158 to filter out distortion of the sensor from one or more stimuli sought to be measured. For example, the sensor may be distorted by lateral shear forces as mentioned above, or by flexing or twisting of the strobel or sole of a shoe when it flexes or twists as the wearer walks, runs, jumps, dodges, shifts, etc. The restraining element 172 may cause the sensor to be immune or relatively insensitive to the distortion of the sensor, while being more sensitive to downward pressure applied to the sensor.

The strobel or sole of the shoe, or any other surface on which the sensor is placed, may also function as an additional restraining element instead of, or in addition to, the restraining element 172.

Figure 4:
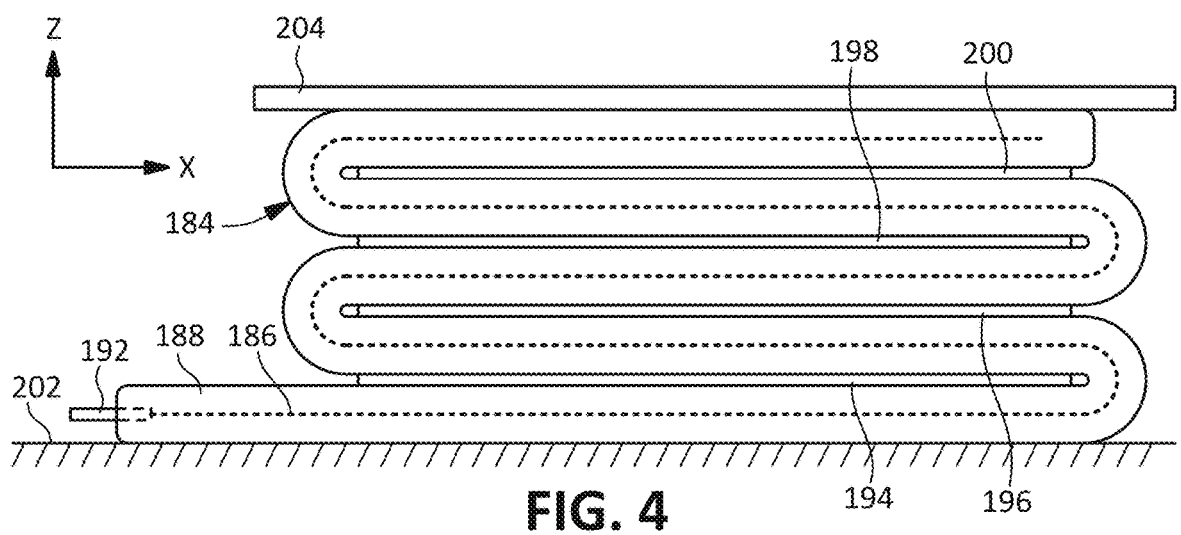
FIG. 4 is a side view of another embodiment of a deformable sensor in a relaxed or neutral state according to some of the inventive principles of this patent disclosure.
Figure 7:
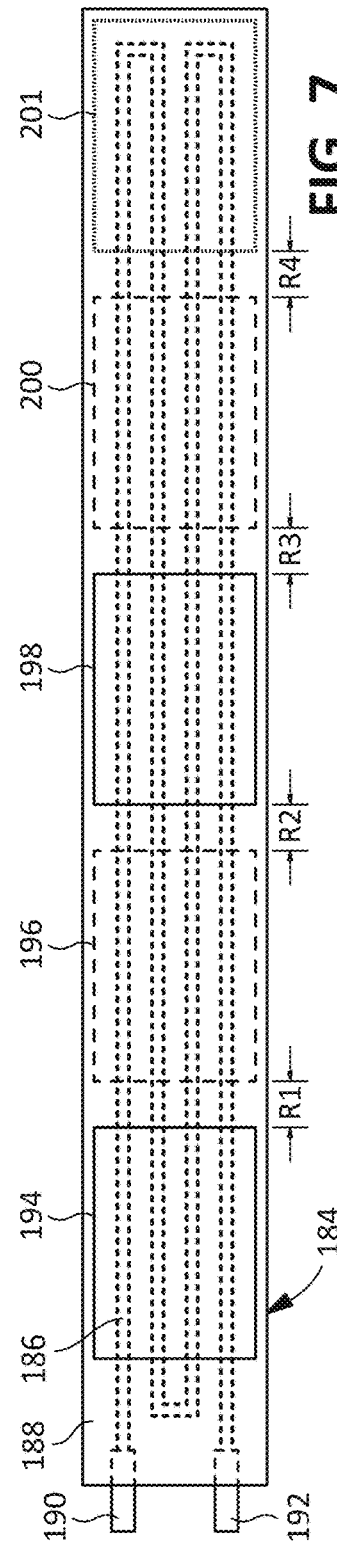
FIGS. 7 and 8 are top and side views of an embodiment of a deformable sensing element suitable for use in the sensor of FIG. 4 according to some of the inventive principles of this patent disclosure.
Figure 8:
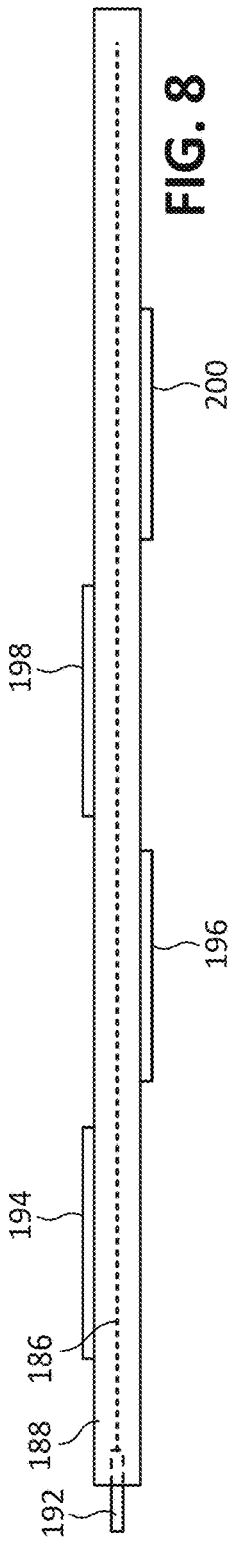

FIG. 4 illustrates another embodiment of a sensor according to some inventive principles of this patent disclosure. The embodiment of FIG. 4 includes a deformable sensing element 184 as shown in FIGS. 7 and 8 which is similar to element 158 of FIGS. 5 and 6 and includes a deformable body 188 having a pattern 186 made from a deformable conductor arranged to deform in response to deformation of the sensing element. Terminals 190 and 192 provide electrical connections to the deformable conductor 186. The embodiment of FIGS. 7 and 8, however, also includes additional restraining elements 194, 196, 198 and 200 which end up sandwiched between layers of the sensing element 184 after it is folded into the structure shown in FIG. 4. The folded sensing element 184 is shown on a reactional ground plane 202. A restraining element 204 is arranged to selectively control the deformation of the sensing element 184.

As with the embodiment of FIG. 2, the embodiment of FIG. 4 may be implemented with a wide variety of materials and used in countless applications. Depending on the implementation details, the additional restraining elements 194, 196, 198 and 200 may provide control over the deformation of the deformable body 188 that is in addition to, or different from, that provided in the embodiment of FIG. 2. In some implementations, the additional restraining elements 194, 196, 198 and 200 may have a higher modulus of elasticity than the deformable body 188. They may therefore provide additional resistance to unwanted distortion caused by localized forces.

The pattern 186 of deformable conductor may have a nominal resistance when the deformable body 188 is in a neutral or relaxed state. If the restraining elements 194, 196, 198 and 200 essentially prevent most or all deformation of the conductor under or above them, then most or all of the change in the nominal resistance due to deformation of the sensor may be confined to the sections designated as R1, R2, R3 and R4. That is, the portion of the resistance that changes in response to deformation may be the sum of the resistances of the sections of conductor in sections R1+R2+R3+R4. (In the view of FIG. 7, a restraining element 201 is shown in phantom outline to indicate the restraining action that may be applied to that section of the sensing element due to the presence of the restraining elements above or below it in the stack of FIG. 4.) Thus, the restraining elements may direct and/or concentrate the sensing action to portions of the sensing element in a selective manner to provide improved control and/or responsiveness of the sensor. In some embodiments, such improved responsiveness may be described as amplification.

In FIG. 4, the sensor is shown in a neutral or relaxed state with no forces applied. The sensor may deform in a manner similar to that of FIG. 2 when a force (pressure) is applied to the restraining element 204 generally in the vertical direction along the z-axis, but with the action of the additional restraining elements 194, 196, 198 and 200 contributing to the deformation of the sensing element 184.

Figure 9:
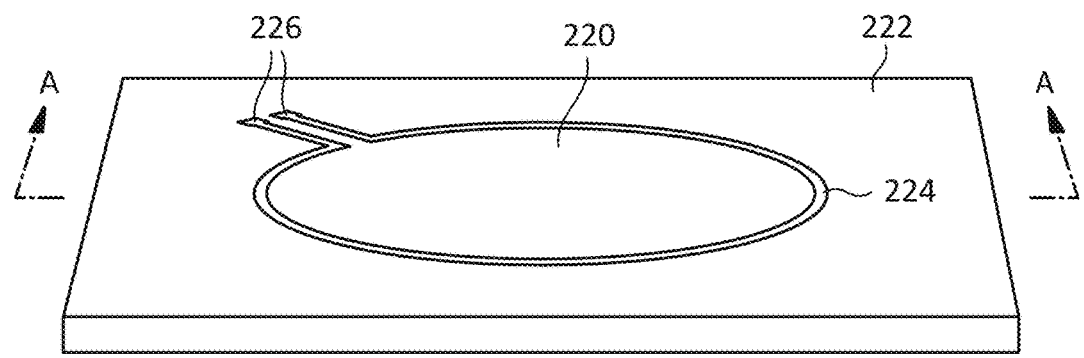
FIG. 9 is a perspective view of another deformable sensor according to some of the inventive principles of this patent disclosure.
Figure 10:
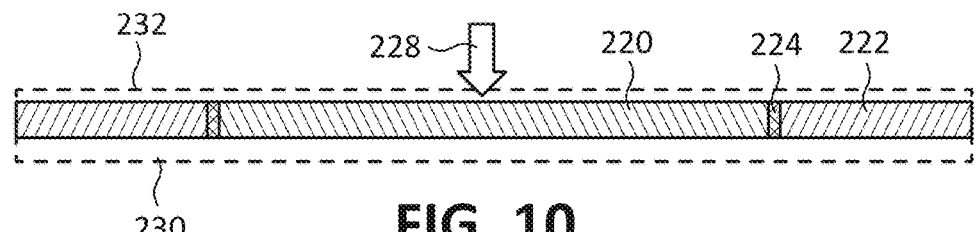
FIG. 10 is a cross-sectional view of the sensor of FIG. 9 taken along section A-A shown in FIG. 9.

FIGS. 9 and 10 illustrate another embodiment of a sensor according to some inventive principles of this patent disclosure. The embodiment of FIGS. 9 and 10 includes a relatively soft deformable body 220 surrounded by a relatively harder restraining element 222. A deformable conductor 224 is disposed along an interface between the deformable body 220 and restraining element 222. Contact pads 226 enable a sensing circuit to be coupled to the deformable conductor 224 which may deform, for example, in response to a force or pressure (as shown by arrow 228) applied to the deformable body 220 which is selectively constrained by restraining element 222. Although FIGS. 9 and 10 show the deformable body 220 as a flat disc and the deformable conductor 224 extending the entire thickness of the body in a trough or well between the deformable body 220 and restraining element 222, many other geometries may be used.

The inventive principles are not limited to any specific materials, but in one example implementation, the deformable body 220 may be implemented with a material having a hardness on the Shore OO scale while the restraining element 222 may be implemented with a material having a hardness on the Shore A scale, for example Shore 90A.

FIG. 10 shows a base material 230 in phantom outline to which the sensor may be attached. For example, the sensor may be attached to any suitable substrate, reactional ground plane, etc. FIG. 10 also shows a material 232 in phantom outline which may serve as an encapsulant, sealant, etc.

Figure 11:
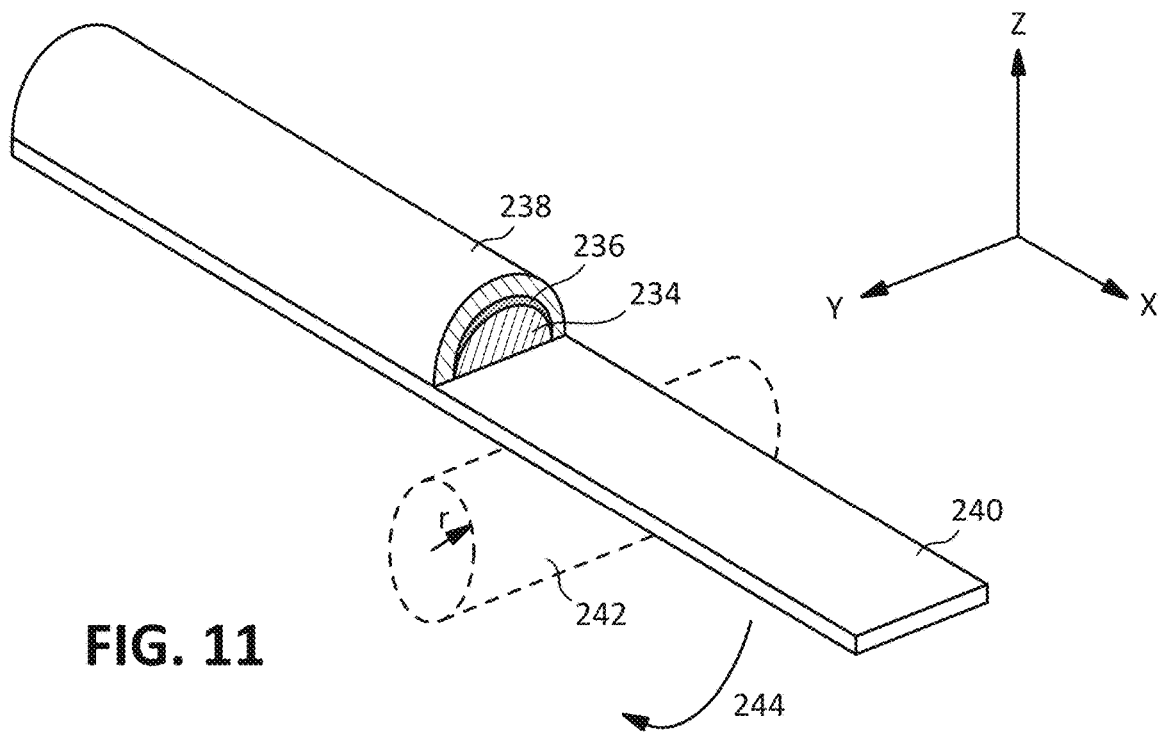
FIG. 11 is a perspective view showing a partial cross-section of another deformable sensor according to some of the inventive principles of this patent disclosure.

FIG. 11 is a perspective view showing a partial cross-section of another deformable sensor according to some of the inventive principles of this patent disclosure. The embodiment of FIG. 11 includes an elongated sensing element having a generally semi-circular cross-section with a core deformable body 234 surrounded by a deformable conductor 236 and enclosed by an encapsulant 238. The sensing element is mounted on a restraining element 240 which may control the deformation of the sensing element.

Although not limited to these details, in one example implementation, the core deformable body 234 may be implemented with a soft elastomer such as silicone or a soft TPU, and the restraining element 240 may be implemented with a controlled motion fabric such as a two-way stretch fabric. If the fabric is oriented to stretch in the Y-axis, i.e., constrained along the length of the sensor in the X-direction, it may enable to sensor to maintain sensitivity to compressive forces or pressure in the Z-direction when the sensor is wrapped around a curved object. For example, the sensor may be wrapped as shown by arrow 244 around the cylinder 242 which is shown in phantom outline and has a radius r. Thus, the restraining element may cause the sensor to selectively maintain sensitivity to a stimulus while rendering it immune or relatively insensitive to distortion of the sensor.

The inventive principles described above in the context of the embodiments of the figures above may be applied to an endless variety of realizations in which a sensing element is selectively restrained to control the deformation of a deformable body and associated deformable conductor. For example, although some examples of the restraining elements in the embodiments of the figures above have been described in the context of systems with restraining elements that are relatively rigid compared to the deformable body, the restraining element need not be more rigid than the deformable body. For example, it may be very flexible but have high tensile strength to restrain with a pulling motion. Likewise, the selective restraining action is not limited to any particular direction, pattern of restraining elements, or configuration of deformable bodies and/or conductors. The inventive principles also extend to many mechanical and geometric configurations. For example, the surface of any material on which a sensor is mounted may function as a restraining element.

In some embodiments, the elements disclosed above may be realized in various additional configurations within the scope of the inventive principles. For example, bonding the folded layers of the deformable body in the embodiment of FIG. 2 may accomplish the same or a similar function as using the additional restraining elements in the embodiment of FIG. 4. As another example, the restraining elements 172, 184, etc. may be omitted as ground planes 170 and 202 or other restraining elements may provide adequate restraint. Restraining elements may be formed integral with the sensing element, e.g., a pattern of more rigid (less deformable) sections of the deformable body may be created though any suitable fabrication process. In addition to deformation in the form of stretching, the inventive principles also apply to embodiments in which restraining elements are arranged to selectively restrain deformation in the form of compression.

Examples of materials that may be suitable for any of the deformable bodies or restraining elements include natural and synthetic rubber and plastic materials such as silicone, TPU, EPDM, neoprene, and polycarbonate, as well as epoxies, pure and alloyed metal, fabrics, wood, leather, paper, fiberglass and carbon and other composite materials, etc.

Examples of materials suitable for use as deformable conductors include conductive gels such as the gallium indium alloys disclosed in U.S. Patent Application Publication No. 2019/0056277 published on Feb. 21, 2019 which is incorporated by reference. Other suitable materials may include any conductive metals including gold, nickel, silver, platinum, copper, etc.; semiconductors based on silicon, gallium, germanium, antimony, arsenic, boron, carbon, selenium, sulfur, tellurium, etc., semiconducting compounds including gallium arsenide, indium antimonide, and oxides of many metals; organic semiconductors; and conductive nonmetallic substances such as graphite. Other examples of conductive gels include gels based on graphite or other forms of carbon and ionic gels. Other examples include liquids such as water, oils, inks, alcohol, etc., any of which may be electroactive, as well as any elastic materials which may be electroactive.

Depending on the implementation details, by selectively restraining a deformable body along selected geometries, the deformation may be restricted to selected planes, curves, directions, etc., in such a way that the conductor may have a greater deformation, i.e., amplification, than may otherwise occur if the body was allowed to deform freely in all directions.

The embodiments disclosed herein may be described in the context of various implementation details, but the principles of this disclosure are not limited these or any other specific details. Some functionality has been described as being implemented by certain components, but in other embodiments, the functionality may be distributed between different systems and components in different locations and having various user interfaces. Certain embodiments have been described as having specific components, processes, steps, combinations thereof, and/or the like, but these terms may also encompass embodiments in which a specific process, step, combinations thereof, and/or the like may be implemented with multiple components, processes, steps, combinations thereof, and/or the like, or in which multiple processes, steps, combinations thereof, and/or the like may be integrated into a single process, step, combinations thereof, and/or the like. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure. The various details and embodiments described herein may be used in conjunction with any of those described in U.S. Patent Application Publication No. 2018/0247727 published on Aug. 30, 2018 which is incorporated by reference, U.S. Patent Application Publication No. 2019/0056277 published on Feb. 21, 2019 which is incorporated by reference, and U.S. Patent Application Publication No. 2020/0066628 published on Feb. 27, 2020 which is incorporated by reference.

Since the inventive principles of this patent disclosure can be modified in arrangement and detail without departing from the inventive concepts, such changes and modifications are considered to fall within the scope of the following claims.

The invention claimed is:

1. A sensor comprising:
   a deformable sensing element; folded into a configuration having layers, having a deformable conductor extending between the layers and arranged to deform in response to deformation of the sensing element, the deformable conductor comprised of conductive gel;
   an encapsulant, disposed at least in part on deformable sensing element, forming a deformable channel encapsulating the conductive gel and configured to deform in conjunction with the deformable conductor;
   a restraining element, comprising a sheet of material; arranged to selectively control deformation of the sensing element, wherein the deformation of the sensing element is selectively controlled by the restraining element.

2. The sensor of claim 1 wherein the sensing element comprises a deformable body with the deformable conductor arranged to respond to elongation of the deformable body.

3. The sensor of claim 2 wherein the restraining element comprises a piece of material having a greater modulus of elasticity than the deformable body.

4. The sensor of claim 3 wherein the restraining element comprises a flat sheet disposed on top of the folded sensing element.

5. The sensor of claim 4 wherein the sensing element is disposed on a reactional ground plane.

6. The sensor of claim 4 wherein the restraining element is a first restraining element and further comprising a second restraining element arranged to selectively control the sensing element.

7. The sensor of claim 6 wherein the second restraining element comprises a sheet of material disposed between the layers of the folded sensing element.

8. The sensor of claim 1 wherein the restraining element surrounds the deformable body in at least one dimension.

9. The sensor of claim 8 wherein the restraining element surrounds the deformable body in a plane.

10. The sensor of claim 1 wherein the sensing element is elongated in a first direction.

11. The sensor of claim 10 wherein the restraining element restrains the sensing element in the first direction.

12. The sensor of claim 11 wherein the restraining element comprises a two-way stretch fabric.

13. A method of manufacturing a deformable sensor, comprising:
   disposing a deformable conductor comprised of conductive gel on a deformable sensing element, the deformable conductor arranged to deform in response to deformation of the sensing element;
   disposing a deformable encapsulant at least in part on deformable sensing element and forming a channel encapsulating the conductive gel and configured to deform in conjunction with the deformable conductor;
   folding the deformable sensing element into a configuration having layers, the deformable conductor extending between the layers; and
   disposing a restraining element comprising a sheet of material, arranged to selectively control deformation of the sensing element, wherein the deformation of the sensing element is selectively controlled by the restraining element.

14. The method of claim 13 wherein the sensing element comprises a deformable body with the deformable conductor arranged to respond to elongation of the deformable body.

15. The method of claim 14 wherein the restraining element comprises a piece of material having a greater modulus of elasticity than the deformable body.

16. The method of claim 15 wherein the restraining element comprises a flat sheet disposed on top of the folded sensing element.

17. The method of claim 16 wherein the sensing element is disposed on a reactional ground plane.

18. The method of claim 16 wherein the restraining element is a first restraining element and further comprising:
   arranging a second restraining element to selectively control the sensing element.

19. The method of claim 18 wherein arranging the second restraining element includes disposing a sheet of material between the layers of the folded sensing element.

20. The method of claim 13 wherein the restraining element surrounds the deformable body in at least one dimension.

* * * * *